(12) United States Patent
Preclik et al.

(10) Patent No.: US 6,640,538 B1
(45) Date of Patent: Nov. 4, 2003

(54) COMBUSTION CHAMBER COOLING STRUCTURE FOR A ROCKET ENGINE

(75) Inventors: Dieter Preclik, München (DE); Fritz Neuner, Miesbach (DE); Thomas Fröhlich, Pliening/Gelting (DE)

(73) Assignee: Astrium GmbH, München (DE)

( * ) Notice: Subject to any disclaimer, the term of this patent is extended or adjusted under 35 U.S.C. 154(b) by 0 days.

(21) Appl. No.: 09/889,399

(22) PCT Filed: Dec. 22, 1999

(86) PCT No.: PCT/DE99/04068

§ 371 (c)(1),
(2), (4) Date: Oct. 15, 2001

(87) PCT Pub. No.: WO00/42310

PCT Pub. Date: Jul. 20, 2000

(30) Foreign Application Priority Data

Jan. 18, 1999 (DE) .......................................... 199 01 422

(51) Int. Cl.⁷ .............................................. F02K 11/00
(52) U.S. Cl. ........................ 60/266; 60/267; 239/127.1; 239/127.3
(58) Field of Search ................ 60/266, 267; 239/127.1, 239/127.3

(56) References Cited

U.S. PATENT DOCUMENTS

| | | | |
|---|---|---|---|
| 3,066,702 A | | 12/1962 | Tumavicus .................. 138/111 |
| 3,177,935 A | * | 4/1965 | Rosman ....................... 165/169 |
| 3,182,448 A | * | 5/1965 | Rabe ............................ 60/267 |
| 3,235,947 A | * | 2/1966 | Sohlemann ............... 29/890.01 |
| 3,595,025 A | * | 7/1971 | Stockel et al. ................. 60/267 |
| 3,690,103 A | * | 9/1972 | Dederra et al. ............... 60/267 |
| 3,692,637 A | * | 9/1972 | Dederra et al. ............. 205/114 |
| 3,738,916 A | | 6/1973 | Butter et al. .................... 204/9 |
| 3,832,847 A | * | 9/1974 | Butter et al. .................. 60/267 |
| 4,078,604 A | * | 3/1978 | Christl et al. ................ 165/133 |
| 4,781,019 A | * | 11/1988 | Wagner ........................ 60/260 |
| 5,221,045 A | | 6/1993 | Crapuchettes et al. ......... 239/1 |
| 5,363,645 A | * | 11/1994 | Pellet ........................... 60/267 |
| 5,467,528 A | | 11/1995 | Bales et al. ............... 29/890.01 |
| 5,832,719 A | * | 11/1998 | Riccardi ....................... 60/267 |
| 6,467,253 B1 | * | 10/2002 | Haggander ................... 60/267 |

FOREIGN PATENT DOCUMENTS

| | | |
|---|---|---|
| DE | 11 18 539 | 11/1961 |
| DE | 11 35 405 | 8/1962 |
| DE | 24 06 976 | 9/1975 |

* cited by examiner

*Primary Examiner*—Charles G. Freay
*Assistant Examiner*—William H. Rodriguez
(74) *Attorney, Agent, or Firm*—Collard & Roe, P.C.

(57) ABSTRACT

A combustion chamber structure (1) comprising a plurality of cooling ducts (31, 41) extending in the longitudinal direction of the combustion chamber structure (1), whereby the combustion chamber structure (1) is rotationally symmetrical in relation to an axis (4) and comprised of an outer structure (11) and a base body (16) of the combustion chamber. The base body comprises ribs (25) preferably extending in the direction of the axis (4). The ribs are arranged in the peripheral direction of the combustion chamber structure and at least one first cooling duct (31) extends in the interior of the ribs.

4 Claims, 1 Drawing Sheet

COMBUSTION CHAMBER COOLING STRUCTURE FOR A ROCKET ENGINE

CROSS REFERENCE TO RELATED APPLICATIONS

Applicants claim priority under 35 U.S.C. §119 of German Application No. 199 01 422.1 filed Jan. 18, 1999. Applicants also claim priority under 35 U.S.C. §120 of PCT/DE99/04068 filed Dec. 22, 1999. The international application under PCT article 21(2) was not published in English.

The invention relates to a cooling structure of the combustion chamber for a rocket engine.

For the purpose of increasing the heating of the coolant in rocket combustion chambers that are cooled in a regenerative manner, provision is made in the prior art for either uncooled longitudinal ribs in the wall of the rocket combustion chamber on the side of the hot gas, or for structures of combustion chambers that are comprised of a plurality of individual tubes. Highly conductive materials such as, for example copper or copper alloys are required for high-pressure combustion chambers because of the generally high thermal load acting on the wall of the combustion chamber.

In conjunction with the concept that comprises uncooled longitudinal ribs provided in the hot-gas wall, the height of the ribs and thus the gain in the amount of heat that can be dissipated is very substantially limited due to the thermal load acting on the rib. As far as the type of construction comprising small tubes is concerned, the maximally achievable increase in the surface area and thus in the heat exchange are very substantially restricted as well under purely geometric aspects. Both concepts in the prior art, therefore, are afflicted with the drawback that the amount of heat that can be dissipated into the cooling medium is unsatisfactory.

Therefore, the invention is based on the problem of proposing measures by means of which it is possible to further enhance the heat exchange with the cooling fluid by way of the structure of the combustion chamber. Said problem is solved with the features of claim 1. Alternative embodiments of the invention are specified in the dependent claims.

For certain concepts of rocket engines it is necessary to maximize the amount of heat supplied to the coolant by way of the structure of the combustion chamber. The goal of the invention is to increase such heat exchange by means of longitudinal ribs that project into the combustion chamber and are actively cooled. The thermomechanical integrity of the structure of the ribs can be assured through active cooling of the ribs in connection with high ribs as well. As compared to the state of the art it is thus possible to increase the size of the surface areas transferring heat and consequently the amount of heat exchanged from the structures of the combustion chamber.

The invention is described in the following with the help of the attached drawing, in which.

Figure 1:
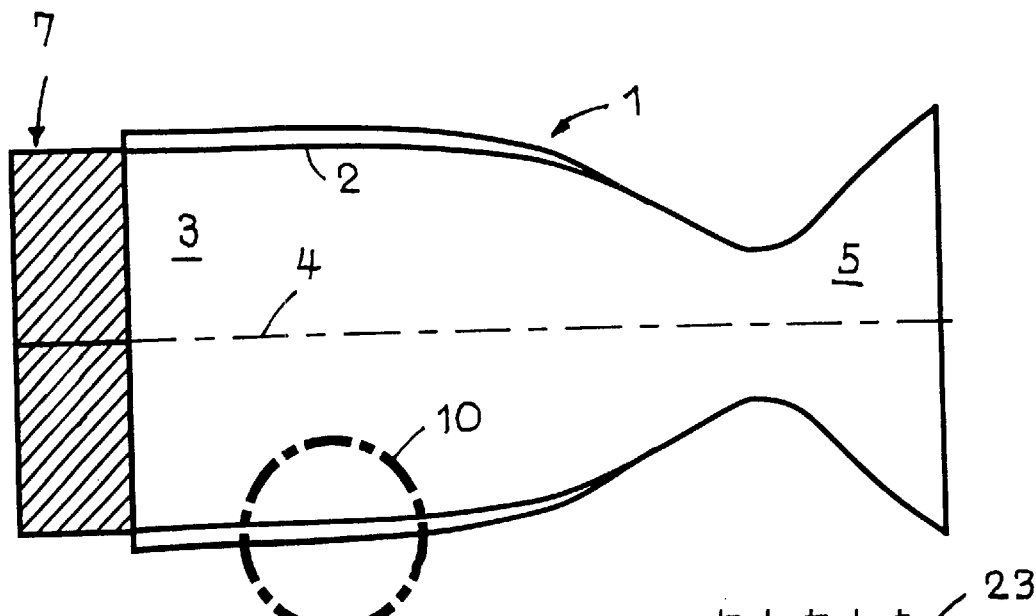
FIG. 1 is a schematic representation of a meridian section through a combustion chamber structure comprising an injection head.
Figure 2:
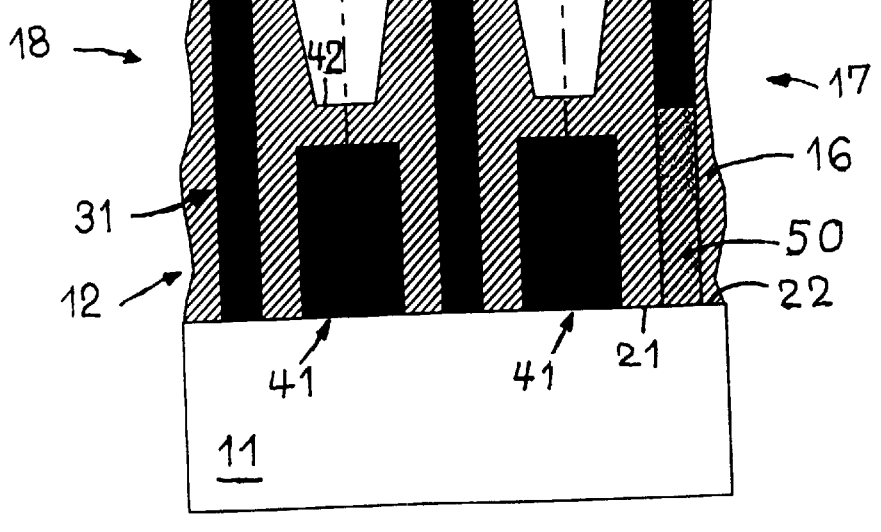
FIG. 2 is a perspective view of a cutout from the combustion chamber structure shown in FIG. 1.

FIGS. 1 and 2 show a combustion chamber structure of which the inner surface 2 defines a combustion chamber 3. The combustion chamber structure 1 is rotationally symmetrical in relation to the axis 4. With its open end, the combustion chamber 3 changes into a nozzle 5. An injection head 7 is arranged on the inlet leading into the combustion chamber 3. In the representation according to FIG. 1, the combustion gas (hot-gas) flows from the left to the right with subsonic velocity before reaching the narrowest cross section, and thereafter from there with supersonic velocity (Laval nozzle).

A cutout 10 is shown in FIG. 1 within the zone of the combustion chamber structure 1. The part of the combustion chamber 1 that is shown in the cutout 10 is represented in FIG. 2 by a perspective view. The combustion chamber structure 1 is comprised of an outer structure 11 and an inner structure 12. The outer structure 11 does not represent any key component of the present invention. A cooling structure 17 projects from the inner structure 12 inwards, i.e. in the direction of the axis 4. The cooling structure 17 is comprised of a basic structure 16 and a rib structure 19.

The combustion chamber structure 1 is preferably formed by the outer structure 11 and the inner structure 12, i.e. the combustion chamber structure 1 is originally preferably comprised of two parts. The outer structure 11 has an inner surface 21 that is facing the cooling structure 17 and, in the integrated state, is connected with the jacket surface 22 of said cooling system in a fixed manner. In the direction towards the combustion chamber 3 with the axis 4, the cooling device 17 comprises an inner contour 23 that is comprised of a plurality of the individual longitudinal ribs 25 that repeat themselves in the peripheral direction of the combustion chamber shown in FIG. 1.

The longitudinal ribs 25 extend with their height from the partial body 18 to the axis 4 of the combustion chamber structure 1 and extend in their longitudinal direction preferably parallel with the axis 4. As an alternative to such an embodiment, provision may be made that the ribs 25 extend longitudinally in the form of a ring or a helical form around the axis 4.

The partial body 18 and the ribs 25 are preferably jointly formed as one single component. The first cooling ducts 31 extend within the ribs 25 in the longitudinal direction of the latter. The ribs are preferably tapering from the transition between the part body 18 and the ribs 25 up to the free end of the respective rib 25. The degree of taper is dependent upon the case of application and is in the range of between 10% and 50% of the thickness of the rib at its foot. The cross section of the cooling ducts 31 preferably extends from the jacket surface 22 up to the free end of the respective rib 25. Via the wall thickness represented by the rib 25, the amount of wall heat collected in the combustion chamber has to be transferred into the cooling medium flowing through the cooling duct 31, 41. Said wall thickness is a function of the thermal load acting on the wall and thus depends on the given application case. Without the outer structure 11, the first cooling ducts 31 would be open on the side of the jacket surface 22 of the part body 18, which means that owing to the fact that the outer structure 11 is arranged around the inner structure 12, the open end of the respective first cooling duct 31 is covered. In its longitudinal direction, the cooling duct extends along the longitudinal direction of the associated ribs 25. The cooling fluid may flow through the cooling duct according to the continuous flow or counter-current flow principle. Within the area of each two ribs. 25, or each two of the first cooling ducts 31, as well as within the zone of the partial bodies 18, provision is made for the additional, second cooling ducts 41. Said second cooling ducts extend in the partial body 18 from the jacket surface 22 with a predetermined spacing up to the free end of the partial body 18 facing the combustion chamber 3, said partial body 18 being located between each two ribs.

Figure 3:
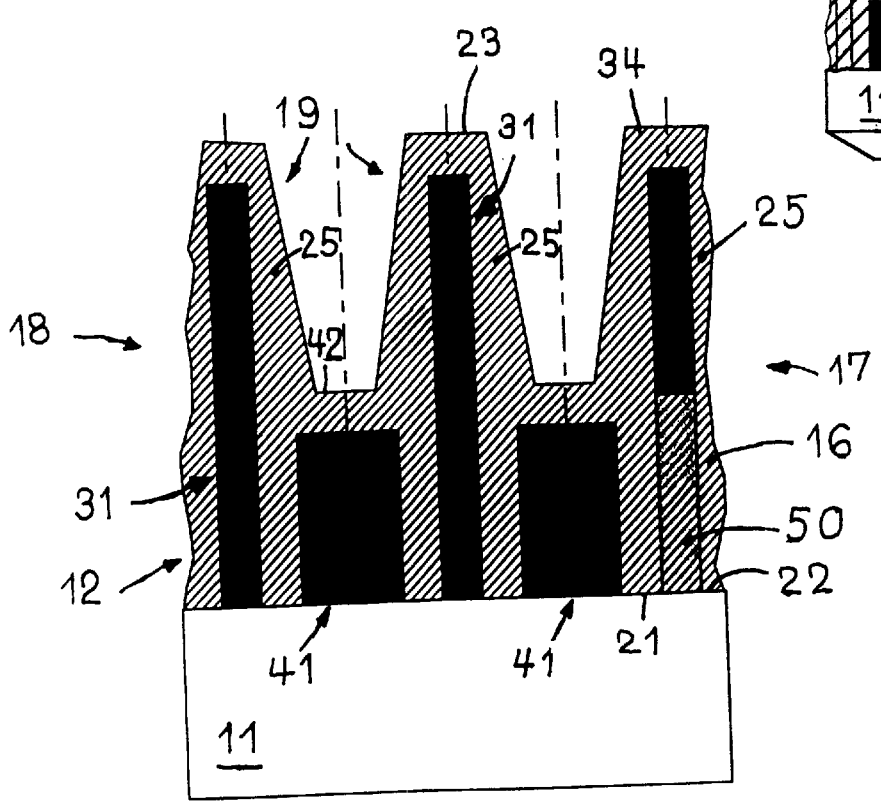
FIG. 3 is a schematic cross section through the combustion chamber structure comprising actively cooled ribs on the hot-gas side. The cooling ducts run along the contour in FIG. 1.

As can be seen in FIG. 3, the second cooling ducts are preferably provided with a substantially greater width, for example with twice the width of the first cooling ducts 31 in order to possess with a substantially lower height a flow-through characteristic similar to the one of the first cooling ducts. Furthermore, an insert 50 is drawn in FIG. 3 in one of the cooling ducts 31 shown there. Said insert may be optimally arranged in one or in several of the cooling ducts 31, 41. The insert 50 is located in this connection in a part of the cooling channel 31, 41 that rests against the outer structure 11 of the two chamber structures 1. Provision can be made for such an insert 50 both in a first cooling duct 31 extending in the zone of the ribs 25, and in a second cooling duct 41 only extending up to the free outer surface 42 of the partial body 18. The cooling medium then flows through the space of the respective cooling duct 31, 41 that is left free of the insert 50.

The function of the outer structure 11 is to cover all of the cooling ducts 31, 41 against the outside, as well as to absorb mechanical and in particular pressure stresses. The shape of the cooling ducts 31, 41, as well as the form of the partial body 18 and of the ribs 25 is independent of the structure and the material of the outer structure 11, as well as of the manner in which the outer structure 11 is tied to the part body 18.

By suitably designing the cooling system 17, i.e. the structure of the ribs 25 and the cooling ducts 31, 41 geometrically, it is possible to coordinate the admission of heat and the cooling system with each other, and to design such a system for a predetermined or required amount of heat. In particular, by providing the ribs 25 with an adequately large spacing in relation to one another, it is possible to largely avoid any influence exerted by the interface between the ribs 25 that would reduce the transfer of heat from the combustion gas in the combustion chamber 3 into the cooling system 17.

In FIG. 3, the cooling ducts 31, 41 have a rectangularly shaped cross section. Alternatively, however, the cross section of the cooling ducts 31, 41 may have another shape as well. Furthermore, the cooling ducts do not have to have a uniform shape within a combustion chamber structure 1. Both the cooling ducts 31 between each other and also the cooling ducts 41 between each other may be realized in different forms of embodiment. Furthermore, several of the first cooling ducts 31 may be arranged within a rib 25, and also several of the second cooling ducts 41 can be arranged between each two of the ribs 25.

By means of the inserts 50 it is possible to adjust the height of the cooling ducts, i.e. the volume of the respective cooling duct 31, 41 through which the cooling medium can flow. In this connection, the inserts do not have to extend over the entire longitudinal expanse of the respective cooling duct 31, 41, but also may be provided in said direction by sections. Furthermore, the inserts 50 may be realized in different shapes within a combustion chamber structure 1. However, as an alternative to the inserts 50, provision may be made also for other measures according to the state of the art as well so as to vary or limit the area of the respective cooling ducts 31, 41 through which the cooling medium can flow. The hydraulic characteristic of the cooling ducts 31, 41 can be determined on the component itself in the course of the intermediate manufacturing stage, and any adaptations of the height of the cooling duct that may be required, if any, can be carried out based on such a determination.

FIGS. 2 and 3 show that the cooling structure 17, i.e. the structure of the ribs 25 and the cooling ducts 31, 41 is preferably an integral component of the base body 16 of the combustion chamber. In terms of manufacturing technology, both the ribs 15 and also the cooling ducts 31, 41 are individually produced by sections in the individual combustion chamber sections, with continuous transitions to the unaffected adjacent sections of the combustion chamber. Mechanical or electro-erosive methods are preferably employed as manufacturing methods.

As opposed to the concepts on which the solutions according to the state of the art are based, the cooling process according to the invention can be optimized by suitably adapting the cooling system 17. By virtue of a suitable geometric design of the ribs 25 and the cooling ducts 31, 41, it is possible to coordinate the admission of heat and the cooling structure and to adjust such admission and such structure to a desired measure. By actively cooling the ribs it is possible to limit the thermo-mechanical stress acting on the ribs even in connection with ribs having a greater height in relation to the axis 4, and to thereby achieve, as compared to the prior art, a substantial increase in the heat-transferring surface areas and consequently an increase in the amount of heat that can be dissipated from the zone of the combustion chamber structure 1.

What is claimed is:

1. A combustion chamber structure (1) comprising an outer structure (11);
    a single-part partial body (18) of the combustion chamber in contact with the outer structure (11) at an outer surface (22) comprised of a basic structure (16) and a rib structure (19) with ribs reaching into the combustion chamber, said ribs repeating themselves in the peripheral direction of the combustion chamber; and the combustion chamber structure (1) with the exception of the single part partial body (18) is rotationally symmetrical in relation to an axis (4);
    a plurality of cooling ducts (31, 41) extending in longitudinal direction of the combustion chamber structure (1), at least one first cooling duct (31) extends in the interior of the ribs (25) from a free end (34) of the respective rib (25) facing away from the outer structure (11), up to the outer surface (22) of the single-part partial body (18) and whereby the rib (25) forms a boundary area of the first cooling duct (31) and the cooling duct (31) rests open against the outer surface (22) of the single-part partial body (18) and is covered by the outer structure (11); and
    at least one second cooling duct (41), said second cooling duct is arranged in the basic structure (16) between each two ribs (25) and covered on the side of the outer structure (11) by said outer structure.

2. The combustion chamber structure according to claim 1, wherein the ribs (25) extend around the axis (4) in the form of a ring or screw.

3. The combustion chamber structure according to claim 1, wherein an insert (50) is arranged in at least one first cooling duct (31), said insert restricting the volume of the first cooling duct (31) through which the cooling medium can flow.

4. The combustion chamber structure according to claim 3, wherein an insert (50) is arranged in at least one second cooling duct (41), said insert restricting the volume of the second cooling duct (41) through which the cooling medium can flow.

* * * * *